Figure 1:
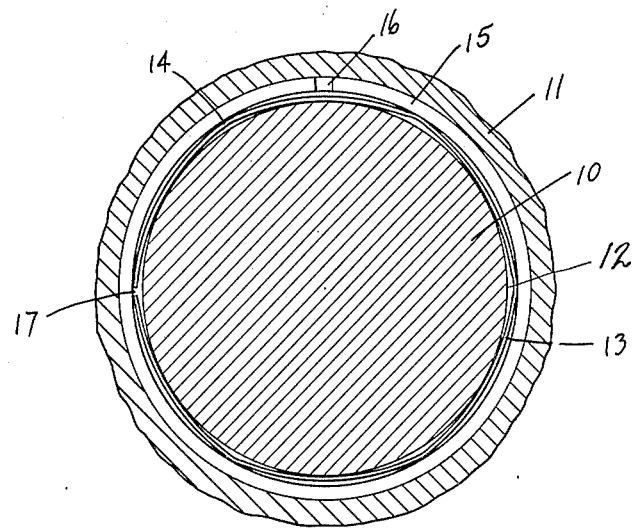

Feb. 24, 1931.  B. F. GREEN  1,793,794

PACKING STRUCTURE FOR PISTONS

Filed May 17, 1930

INVENTOR.
BENJAMIN F. GREEN.
BY
Lockwood Lockwood Goldsmith & Galt
ATTORNEYS.

Patented Feb. 24, 1931

1,793,794

UNITED STATES PATENT OFFICE

BENJAMIN F. GREEN, OF ST. LOUIS, MISSOURI, ASSIGNOR TO RAMSEY ACCESSORIES MANUFACTURING CORPORATION, OF ST. LOUIS, MISSOURI

PACKING STRUCTURE FOR PISTONS

Application filed May 17, 1930. Serial No. 453,128.

This invention relates to a packing for pistons and particularly for use in connection with internal combustion engines. The packing structure forming this invention comprises the combination of an inner expander ring positioned in the piston ring groove behind a piston ring.

It is well known in the art that cylinders become slightly out-of-round, both through the medium of heat as applied to new cylinders, wear and constant variation in temperature in respect to old cylinders. It is the function of the packing on the piston to adapt itself to variations in the cylinder wall so as to make contact therewith in such manner as to prevent leakage of oil, as well as gas, past the face of the ring. This requires a definite surface contact at all times during the rapid reciprocation of the piston so that free radial oscillation of the ring within the piston groove is essential. This is accomplished in many instances by providing an inner expander ring behind the piston ring to assist it in its rapid radial oscillation. It is well known that the tension of the expander, while being sufficient to maintain the live radial action of the ring, must not be of such tension as to exert a pressure to cause excessive friction between the face of the ring and the cylinder wall. In other words, there must be a balance in the tension of the expander to obtain the necessary radial pressure with a minimum of friction.

Furthermore, there may be leakage of compression and oil around the ring, between the ring and the walls of the groove. It has been sought to avoid this condition by providing a laminated ring or a ring having compressible side walls adapted to yieldingly maintain a sealing fit with the top and bottom sides of the groove. By thus providing such sealing contact with the walls of the groove under tension, substantial resistance is imparted to the free radial oscillation of the ring which is highly essential, to say nothing of the freezing of the ring in the groove through carbonization and packing of the hardened carbon deposits in the ring slots and between the ring and walls of the groove.

Wherein the ring is loosely mounted in the groove to oscillate vertically into sealing contact with one or the other walls of the groove, due to the reciprocating movement of the piston, it has been found that the ring will be locked against such movement by engagement of the protruding corners and edges of the expander with the inner surface thereof. This occurs when the edges of the expander at the point of engagement with the ring cut into the ring or engage a rough surface therein such as to lock it against the desired vertical reciprocating movement.

It is the object of this invention to so construct a piston ring that it will cooperate with an inner expander to permit continued free sliding movement with respect thereto between the walls of the groove to effect a seal, first with one wall and then the other as the piston is caused to reciprocate; and also by reason of the looseness of the piston ring in the groove permit the free flexing thereof and allow unresisted radial oscillation, to maintain constant contact with the cylinder wall regardless of the slightly non-cylindrical character thereof. Thus, the perfect freedom of the ring to reciprocate up and down between the walls of the groove to effect the desired seal therewith, coupled with its perfect freedom to flex radially to maintain the seal with the piston wall without excessive friction is accomplished through the medium of this invention.

The principal feature of the invention consists in providing the inner wall of the piston ring with a slightly convex face in cross section, said face being substantially more convex than the concave surface inherent in the contacting surfaces of the expander. This prevents the edges of the expander from cutting into or interlocking with the surface of the ring, said edges having no contact therewith due to said greater convex surface. This allows a free sliding movement between the expander and ring whereby the ring will readily oscillate between the walls and groove, while causing the rings to center themselves with respect to each other.

Where a convex inner face of the piston ring is referred to, it will be understood that substantially the same effect is obtained by bevelling the edges thereof so that while the center part of the ring is substantially straight in cross section as distinguished from convex, the general contour of the inner surface will be substantially convex.

The full nature of the invention will be understood from the accompanying drawings and the following description and claims.

Figure 2:
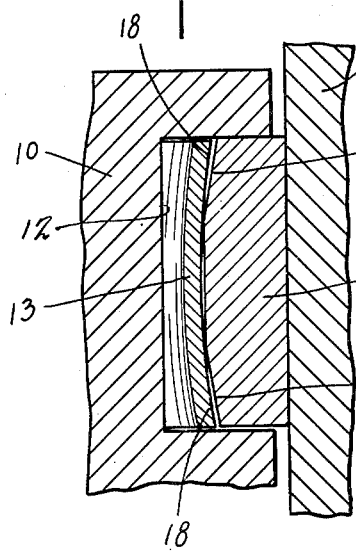
Figure 3:
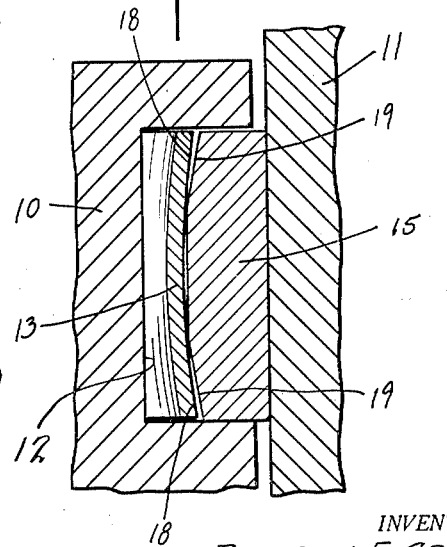

Fig. 1 is a plan view of the piston ring and expander in a piston groove and cylinder. Fig. 2 is an enlarged illustrative section taken on the line 2—2 of Fig. 1 when the piston is on the down stroke. Fig. 3 is the same as Fig. 2 showing the piston on the up stroke.

In the drawings there is shown a piston 10 adapted to reciprocate in a cylinder 11, said piston being provided with the usual piston grooves 12. Mounted within the piston groove and slightly spaced from the side walls thereof, there is an inner expander ring 13 of a polygonal form having substantially straight sides joined by short curved bearing surfaces 14, adapted to bear against the inner surface of the piston ring 15. The piston ring is split at 16 and the inner expander ring is split at 17.

Each of the apexes or curved connections between the substantially straight sides of the expander engage and bear against the inner wall of the piston ring and, therefore, may be termed the ring bearing surfaces, the intermediate portions of the straight sides bearing against the inner wall of the piston groove. Said expander bearing portions are necessarily formed with a slightly concave surface as best illustrated in Figs. 2 and 3, wherefore in bearing against the inner surface of a piston having a flat wall, the edges of the bearing surfaces indicated at 18 dig into and interlock with the ring so as to have a tendency to prevent the piston ring from the necessary free movement between the side walls of the groove. The sharp edges have the effect of cutting recesses or grooves in the inner surface of the ring in time, but irrespective thereof, they engage with and interlock in the roughened surface of the ring caused by the turning of the inner surface thereof.

In order that the edges 18 of the inner spring will not engage and interlock with the inner surface of the ring, said ring is formed with a substantially convex inner surface in cross section, which is preferably formed by slightly bevelling the inner edges of said ring as indicated at 19 to prevent contact with the sharp edges 18 of the inner spring, as best illustrated in Figs. 2 and 3. It will also be noted that the concavo-convex contact between said rings will cause them to normally center relative to each other while permitting free sliding movement axially.

By means of this construction, the desirable valve action or "valving" of the piston ring in the ring groove is obtained, wherein the ring moves to closing and sealing position against the top of the groove on the downward stroke as illustrated in Fig. 2 and freely moves to closing and sealing position with respect to the lower wall of the groove on the upward stroke of the piston as illustrated in Fig. 3. Thus, the ring freely acts as a valve and the "valving" action is readily permitted by the inner expander ring with minimum resistance and elimination of any locking between said rings. This "valving" action prevents passage of oil around the ring while at the same time permits the ring to be loosely mounted in the groove so as to have free and unresisted breathing action or radial oscillation to conform with irregularities in the cylinder wall. This freedom of the "valving" and the breathing of the ring essential to oil control permits a minimum spring tension to be exerted on the ring by the expander and, therefore, minimum friction between the ring and cylinder wall which is highly desirable.

The invention claimed is:

1. In a piston ring structure, the combination of an inner expander ring and a piston ring, said inner expander ring having portions of its surface adapted to engage and bear against the inner wall of said piston ring, the outer surfaces of the bearing portions of said inner expander ring being slightly concave in contour and the inner surface of said piston ring being substantially convex in contour, the general curvature of the convex surface being slightly greater than the curvature of the concave surface.

2. In a piston ring structure, the combination of an inner expander ring and a piston ring, said inner expander ring having a plurality of bearing surfaces adapted to engage the inner surface of said piston ring, said bearing surfaces being slightly concave in contour and the inner surface of said piston ring being substantially convex in form and of greater general curvature than the concave surface of said expander to prevent contact between the edges of the concave bearing portions of the expander and the inner surface of the piston ring.

3. In a piston ring structure, the combination of an inner expander ring and a piston ring, said inner expander ring having a plurality of bearing surfaces adapted to engage the inner surface of said piston ring, said bearing surfaces being slightly concave in contour and the inner surface of said piston ring having the edges thereof slightly bevelled to give it a surface substantially convex in contour and of greater general curvature than the concave surface of the expander whereby the edges of the bearing portions of said expander will not engage with the inner surface of the piston ring.

4. The combination with a piston having a ring groove therein and a cylinder in which said piston is adapted to reciprocate, of a ring structure comprising an inner expander ring having a plurality of ring bearing portions slightly concave in contour, a piston ring mounted in said groove about said expander ring, said piston ring being of less width than said groove so as to have axial movement therein, and the inner wall of said ring being substantially convex in contour to engage with the concave bearing surface of said expander and center said expander and ring relative to each other, the general curvature of the substantially convex surface of said ring being greater than the curvature of the concave bearing surface of the expander to prevent engagement of the edges of the expander with the surface of the ring.

In witness whereof, I have hereunto affixed my signature.

BENJAMIN F. GREEN.